United States Patent Office 3,116,638
Patented Jan. 7, 1964

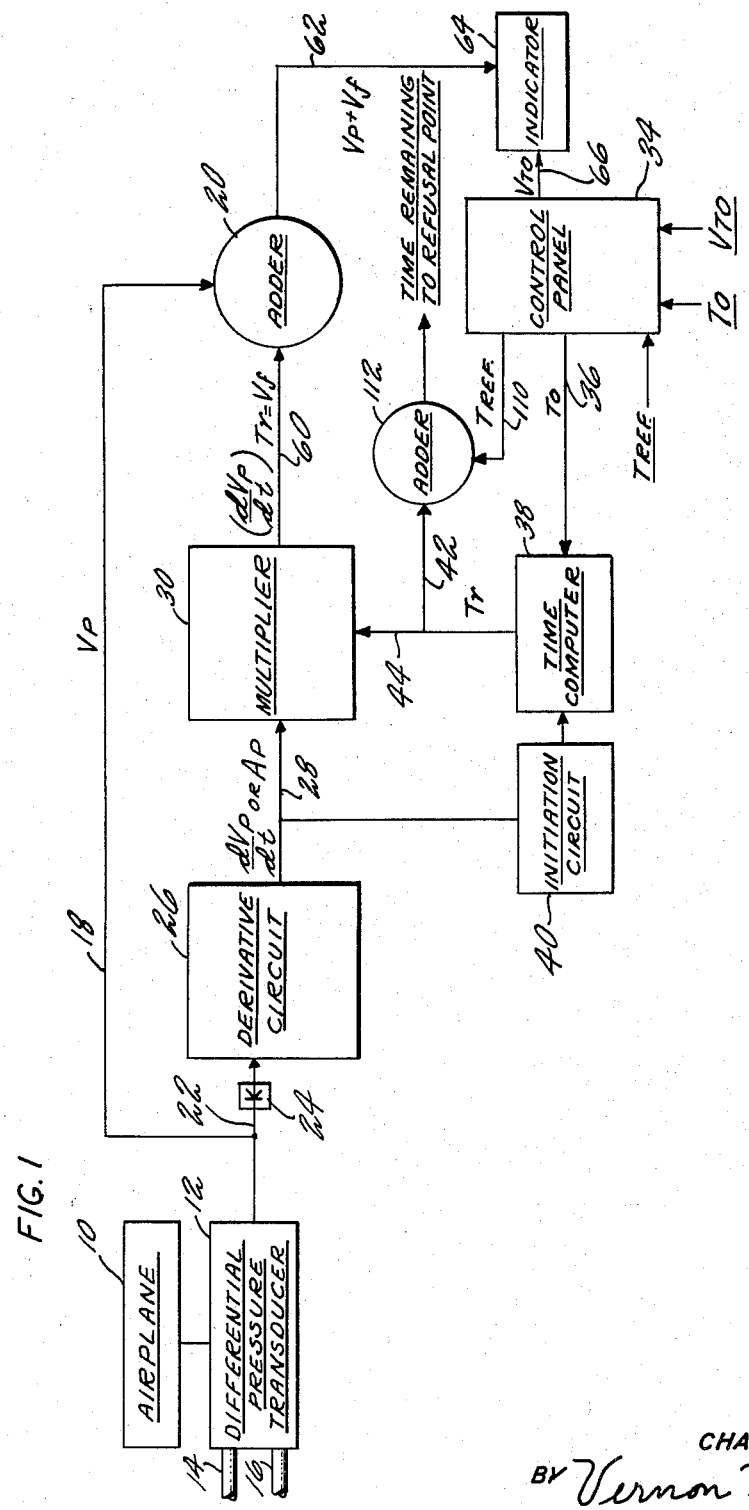

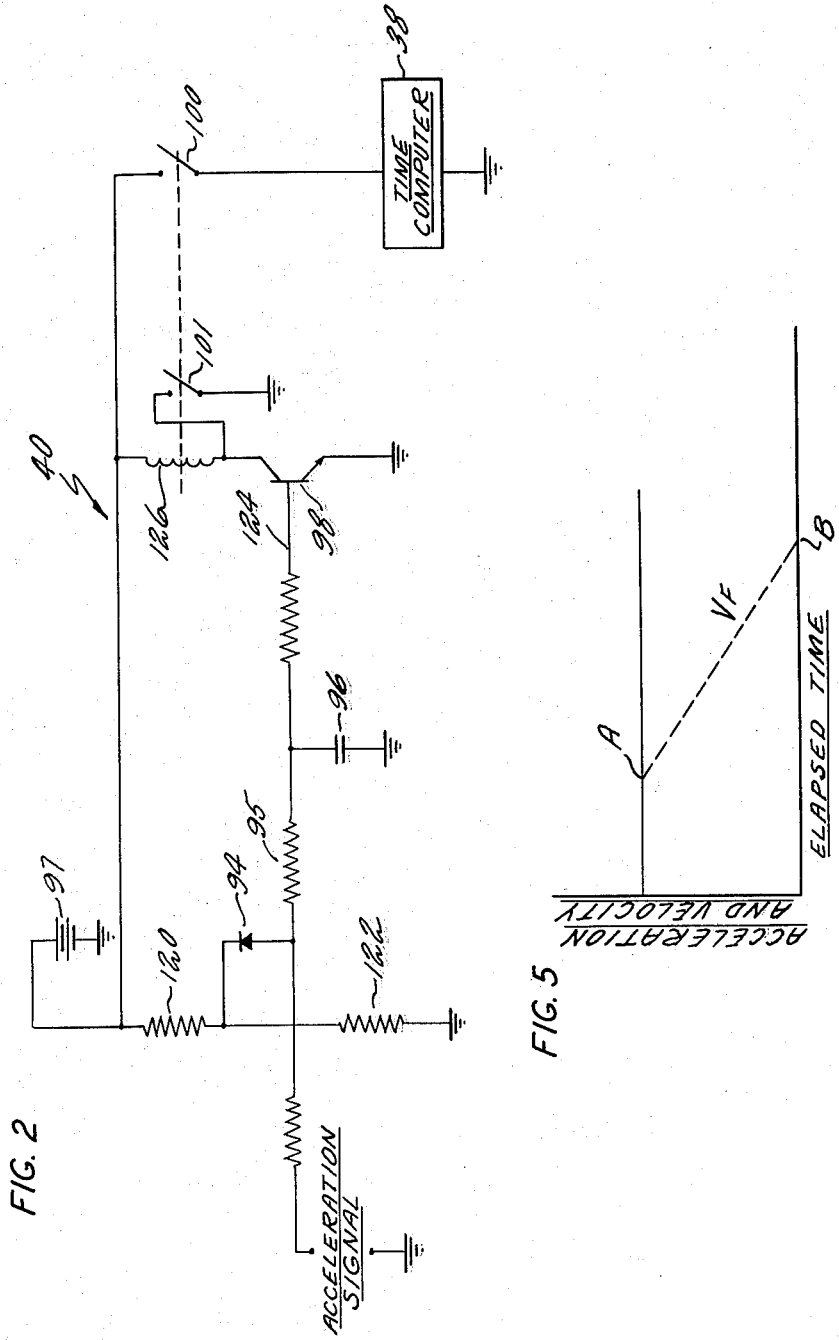

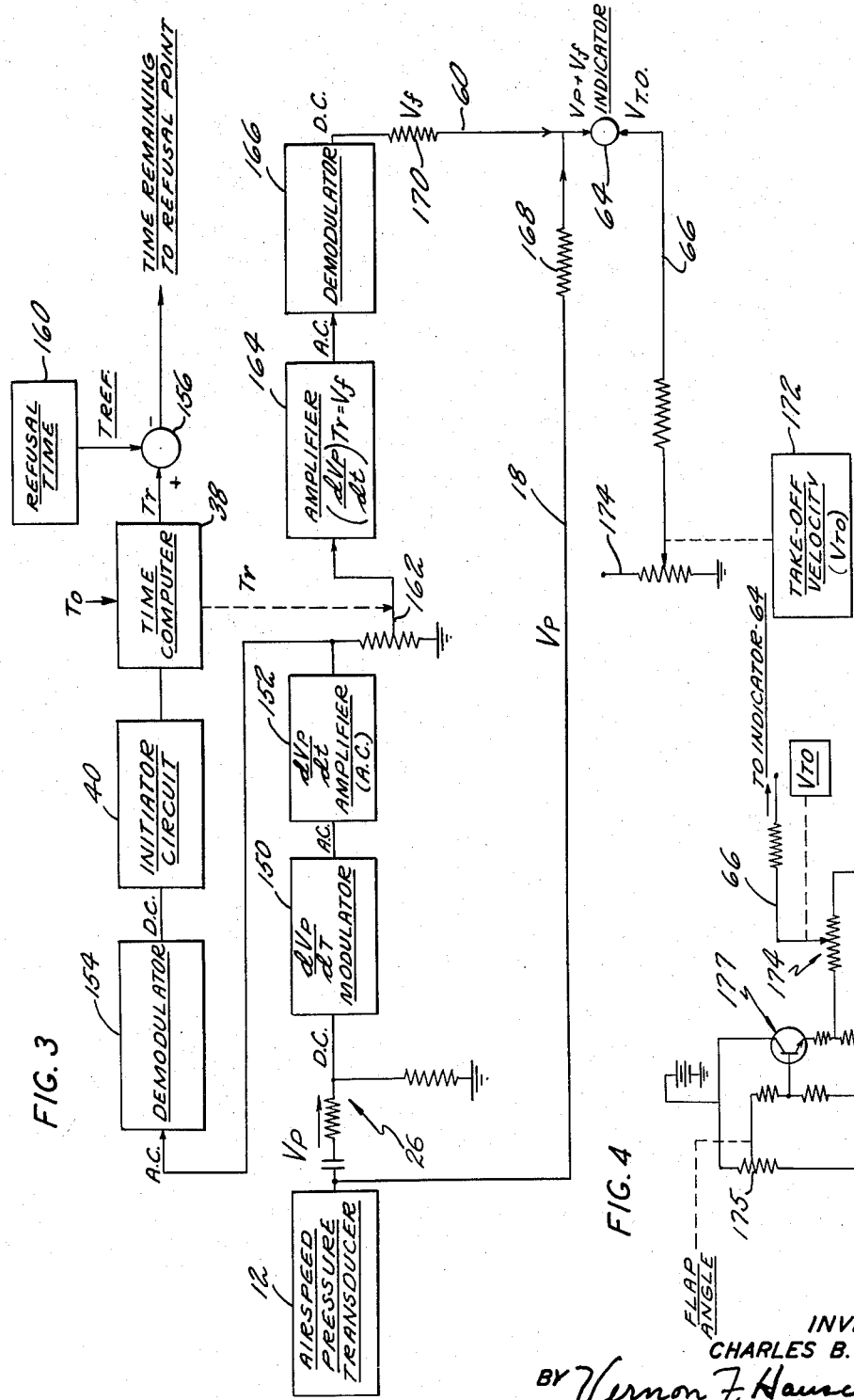

3,116,638
TAKE-OFF COMPUTER
Charles B. Brahm, Ellington, Conn., assignor to United Aircraft Corporation, East Hartford, Conn., a corporation of Delaware
Filed Jan. 6, 1959, Ser. No. 785,172
8 Claims. (Cl. 73—178)

This invention relates to airplane take-off safety and more particularly to the teaching of an aircraft take-off monitor.

In the age of jet aircraft, a number of problems have arisen not previously troublesome with propeller-driven planes. Among these problem areas have been the hazards and uncertainties of take-off. It is important that falsely aborted take-offs should be avoided from a safety, economy and operations standpoint and it is equally as important that the pilot be warned as early as possible in take-off roll whether, under the present airplane and climatic conditions, the airplane will be airborne at take-off point. If the airplane is incapable of proper take-off under these conditions, the pilot should begin his braking attempts as early as possible.

It is an object of this invention to provide mechanism which will advise the aircraft pilot early in the take-off roll whether the aircraft will be airborne at the runway take-off point.

It is a further object of this invention to teach an airplane take-off monitor in which the present aircraft velocity ($V_p$) is ascertained early in the take-off roll and continuously thereafter, then differentiated into aircraft acceleration, which acceleration is multiplied by the time remaining ($T_r$) or the distance remaining ($D_R$) to the runway take-off point to provide a product, which product and present velocity ($V_p$) are added and compared to the calculated take-off velocity ($V_{TO}$), required lift or aircraft weight to ascertain early in the aircraft take-off roll and continuously thereafter whether the airplane will be airborne at take-off point.

Other objects and advantages will be apparent from the specification and claims, and from the accompanying drawings which illustrate an embodiment of the invention.

FIG. 1 represents a block diagram of my take-off monitor.

FIG. 2 is an electrical diagram showing my initiation circuit.

FIG. 3 is an electrical diagram illustrating my take-off monitor.

FIG. 4 is an electrical schematic showing compensation for airplane flap angle.

FIG. 5 is a graphic representation of the effect of multiplying the acceleration signal by time remaining to the take-off point to obtain a predicted future velocity signal.

My take-off monitor has been designed so that it will calculate early in take-off roll a predicted aircraft lift or aircraft velocity at the runway take-off point, based upon airplane and climatic conditions, for example, aircraft gross weight, assisted take-off, flap angle, runway gradient and surface conditions, altitude, dew point, and air temperature, and compare same to the manually calculated lift required to overcome aircraft weight or to the aircraft take-off velocity ($V_{TO}$) which will be necessary to permit take-off at take-off point. The mathematical derivation of the equation which will be used by my take-off monitor will now be fully explained.

The lift available from an aircraft is given by the equation:

(Equation 1)  $L=\dfrac{AC_1\rho}{2}(V_p+V_w)^2$ $L$=lift
$A$=effective wing area
$C_1$=coefficient of lift at the maximum angle of attack to be used at take-off
$\rho$=air density
$V_p$=aircraft ground velocity
$V_w$=wind velocity parallel with aircraft At take-off, the lift must at least equal the weight (W) of the aircraft, so that, at take-off, (Equation 2)  $V_p+V_w \geq \sqrt{\dfrac{2W}{AC_1\rho}}$ The difference between static and total pressure ($\Delta P$) at the front of the aircraft is:

(Equation 3)  $\Delta P=\dfrac{\rho}{2}(V_p+V_w)^2$

If a pressure transducer is used to convert the pressure difference, $\Delta P$, into a voltage E, which is proportional to the square root of $\Delta P$, the following relationships are established:

(Equation 4)  $E=K\sqrt{\Delta P}$ (Equation 5)  $E=K\sqrt{\dfrac{\rho}{2}}(V_p+V_w)$ (Equation 6)  $V_p+V_w=E\dfrac{1}{K}\sqrt{\dfrac{2}{\rho}}$ The rate of acceleration will tend to remain constant during the take-off run, since both the engine thrust and drag build up with air speed.

If we assume that the acceleration of the aircraft remains constant during the take-off run, we can compute the group speed which will exist at take-off point by multiplying the rate of change of velocity by the time remaining ($T_r$) before the aircraft reaches take-off point, and adding this value to the existing airplane velocity. Thus, (Equation 7)

$V_p+V_w+\dfrac{dV_p}{dt}T_r$=take-off velocity ($V_{TO}$)

From the lift equation previously developed, Equation (2), we know that the air speed at take-off must be greater than a value obtained by transposing in Equation 2, so that:

(Equation 8)  $V_p \geq \sqrt{\dfrac{2W}{AC_1\rho}}-V_w$

The time ($T_0$) required to make the take-off run will be equal to the runway length to take-off point (X) divided by the average velocity. Since the acceleration will be essentially constant, the average velocity will be equal to one-half the final velocity, so that:

(Equation 9)  $T_0=\dfrac{2X}{\sqrt{\dfrac{2W}{AC_1\rho}}-V_w}$

The normal wind velocity is small compared to the required air speed at take-off, so that variations in wind velocity will not have a large effect on the time required to complete the take-off run. The normal variation in air density and take-off weight will also have a relatively small effect on the take-off time $T_0$, since these parameters do not vary over a wide range, and also because the take-off time is affected as a function of the square root of these parameters. While all these variables could be included in the calculation of the take-off time, it is felt that all variations other than runway length can be ignored, so that:

(Equation 10) $\qquad T_0 = K_1 X$ (Equation 11) $\qquad K_1 = \dfrac{2}{\sqrt{\dfrac{2W_{max}}{AC_1 \rho_0}}}$ $W_{max}$ = maximum take-off weight
$\rho_0$ = standard air density The time remaining before the aircraft reaches the take-off point can be obtained by calculating $T_0$, and subtracting the time elapsed ($t$) since the start of the take-off run.

The rate of change of air speed can be used as a measure of the rate of change of aircraft velocity if we assume that the wind velocity remains relatively constant. Thus:

(Equation 12)

$$\frac{dV_p}{dt} = \frac{1}{K}\sqrt{\frac{2}{\rho}} \frac{dE}{dt} \text{ (using Equation 6 and disregarding } V_w\text{)}$$

and the calculated air speed at the take-off point is equal to:

(Equation 13)

Calculated take-off point air speed $$= V_p + \frac{dV_p}{dt}(T-t) \text{ (using Equation 7)}$$

(Equation 14)

Calculated take-off point air speed $$= \frac{1}{K}\sqrt{\frac{2}{\rho}}\left[E + \frac{dE}{dt}(T-t)\right] \text{ (incorporating Equation 6)}$$

The required air speed has previously been calculated to be equal to:

(Equation 15)

$$V_p = \sqrt{\frac{2}{\rho}}\sqrt{\frac{W}{AC_1}} \text{ (see Equation 8)}$$

When the calculated air speed is equal to the required air speed, the take-off is just possible, and (Equation 16)

| calculated air speed | required air speed |
|---|---|
| $\dfrac{1}{K}\sqrt{\dfrac{2}{\rho}}\left[E + \dfrac{dE}{dt}(T-t)\right]$ | $= \sqrt{\dfrac{2}{\rho}}\sqrt{\dfrac{W}{AC_1}}$ |

(Equation 17) $E + \dfrac{dE}{dt}(T-t) = K\sqrt{\dfrac{W}{AC_1}}$ or, since E is proportional to $V_p$, (Equation 18) $V_p + \dfrac{dV_p}{dt}(T-t) = K\sqrt{\dfrac{W}{AC_1}}$ Since the right hand side of Equation 18 is representative of the airplane speed or velocity necessary for take-off, as calculated in Equations 8 and 16, it will be referred to as take-off velocity ($V_{TO}$)

(Equation 19) $\qquad K\sqrt{\dfrac{W}{AC_1}} = V_{TO}$ and the term $$\frac{dV_p}{dt}(T-t)$$

since it is the velocity which will be added to the present velocity ($V_p$) during the time remaining ($T_r$) before take-off point assuming a constant acceleration, will be referred to as future velocity ($V_f$), (Equation 20) $\dfrac{dV_p}{dt}(T-t) = \dfrac{dV_p}{dt}T_r = V_f$ (Equation 21) $\qquad V_p + V_f = V_{TO}$ which states that the present velocity of the aircraft plus the velocity which will be gained by reason of present acceleration must equal or exceed the velocity necessary for the aircraft to take off if a successful take-off is to be made.

When the left side of Equation 18 or 21 is larger than the right side, the take-off run is proceeding satisfactorily. When the left side is the smaller of the two, the take-off attempt must be stopped.

In the fashion now to be described, my take-off monitor is used to derive the calculated air speed or left side of Equation 18, i.e., $$V_p + \frac{dV_p}{dt}(T-t)$$

while the required air speed ($V_{TO}$) or right side of Equation 18 is calculated in advance and preferably manually entered into our control panel for monitor comparison purposes.

Referring to FIG. 1 we see that airplane 10, which may be of any conventional type well-known in the art, which carries therewith on its take-off run differential pressure transducer 12 which includes total pressure tap 14 and static pressure tap 16 to provide a pressure differential proportional to aircraft runway velocity or present velocity ($V_p$) which, in accordance with Equations 4 and 17 generates voltage E. From differential pressure transducer 12, the present velocity ($V_p$) signal in the form of voltage E is transmitted both through line 18 to adder 20 and also through line 22 and attenuator 24 into derivative or differential circuit 26, from which and through line 28 a velocity derivative signal $$\left(\frac{dV_p}{dt}\right)$$

which represents present acceleration ($A_p$), is transmitted to multiplier 30. At the same time that the velocity derivative signal $$\left(\frac{dV_p}{dt}\right)$$

is being provided to multiplier 30, a second signal known as runway time remaining ($T_r$) is also provided to multiplier 30 in the following fashion. Total runway time ($T_0$), namely the time from the beginning of take-off roll to take-off point is calculated in advance and manually entered into control panel 34 from whence it passes along line 36 into time computer 38, which is essentially a clock which commences running at a time dictated by initiation circuit 40 in a fashion to be described hereinafter in connection with FIG. 3, and indicates elapsed time ($t$).

The two signals, total runway time ($T_0$) and elapsed runway time ($t$), are subtracted in time computer 38 to derive remaining runway time ($T_r$). This remaining time signal $T_r$ is the second signal which enters multiplier 30 through line 44 simultaneously with the velocity derivative signal from line 28. From multiplier 30, the future velocity signal $V_f$, which is equal to $$\left(\frac{dV_p}{dt}\right)T_r$$

is passed through line 60 to adder 20 together with the present velocity signal $V_p$ which is provided thereto through line 18. From adder 20 the sum of the present velocity signal $V_p$ and the future velocity signal $V_f$ is transmitted along line 62 to indicator 64 to be compared therewith with the velocity calculated to be necessary for take-off ($V_{TO}$). This calculated take-off velocity ($V_{TO}$) is calculated from the right side of Equation 18 and is manually entered into control panel 34 as, for example, by a dial in the pilot's compartment, and passes along line 66 to provide a required air speed signal, $V_{TO}$, to be compared in indicator 64, preferably in a go-no-go visual or audible signal to indicate to the pilot whether take-off can safely be made or should be aborted. This is the basic take-off monitor, however there are preferred additions which should advantageously be made thereto and which will now be described.

FIG. 5 illustrates graphically how the future velocity signal ($V_f$) is computed. Assuming that acceleration is a constant, initiator circuit 40 will actuate time computer 38 after a specified delay. When this occurs, indicated by A on FIG. 5, time computer 38 will vary potentiometer 162 and effectively multiply the $$\left(\frac{dV_p}{dt} \text{ or } A_p\right)$$

signal by the difference between the total runway time ($T_0$) and elapsed time ($t$), which has been called time remaining ($T_r$). The computed time remaining ($T_r$) will be a decreasing value, so that as time passes, $T_r$ will eventually become zero, as point B in FIG. 5. Now the present velocity ($V_p$) must equal the predetermined take-off velocity ($V_{TO}$) for the aircraft to become airborne. As time remaining ($T_r$) decreases, the computed signal ($V_f$) will also decrease, since in the shorter time remaining a constant acceleration will result in a smaller increase in velocity.

Further, since our aircraft will accelerate very rapidly within the first few seconds of take-off roll and then stabilize thereafter and because it is desirable to eliminate pilot start buttons, it is desirable that time computer 38 not commence running during taxiing but delay until a prescribed length of time has elapsed from the beginning of take-off roll and until a given acceleration has been reached. Initiator circuit 40 shown more completely in FIG. 2 accomplishes this function.

An acceleration signal, possibly from derivative circuit 26 is passed to initiator circuit 40. Clipping diode 94 is biased to some positive voltage by resistors 120 and 122. The function of the clipping diode is to limit the maximum magnitude of the positive voltage and to provide a constant step signal to a time lag circuit comprising resistor 95 and capacitor 96. The integrated output of capacitor 96 will, when it builds up as determined by the time constant of the circuit, forward bias transistor 98 and allow current to flow from source 97 through solenoid 126 and transistor 98 to ground. Energization of solenoid 126 closes switches 100 and 101 and permits a flow of current to actuate time computer 38.

The constant voltage from capacitor 96 coupled with the time constant of the integrator network provides a constant voltage output with respect to time regardless of the input acceleration. This circuit will always energize the time computer at a fixed time after take-off is initiated, making the circuit independent of the acceleration signal.

Closing latch switch 101 gives the current from source 97 an additional path to ground, so that if the acceleration signal should decay and transistor 98 is turned off, solenoid 126 will remain energized and switch 100 will also remain closed.

It is also considered important to advise the pilot when he passes his final refusal point on the runway so that he may take immediate braking action at that point. To accomplish this purpose, we calculate, considering the aircraft and climatic conditions, the time of refusal ($T_{ref.}$) from initial take-off until this refusal point will be reached and put such a signal into control panel 34 from which it is fed through line 110 to adder 112 which also receives from line 42 a time remaining ($T_r$) signal. Adder 112 gives the pilot either visible or audible warning when the difference between time of refusal ($T_{ref.}$) and time remaining ($T_r$) reaches a preselected minimum figure to permit reaction time and effective braking of the airplane within runway length.

FIG. 3 illustrates the electrical circuitry for my take-off monitor. Reference numerals corresponding to those used in the description of FIG. 1 will be used whereever applicable. The present velocity $V_p$ signal from air speed pressure transducer 12 is passed through line 18 and also through derivative circuit 26 so that the D.C. signal $$\frac{dV_p}{dt}$$

is provided to modulator 150 from whence it passes to amplifier 152 as an A.C. signal. The A.C. signal from amplifier 152 passes through two paths. The first of these paths is through demodulator 154 from whence it is passed as a D.C. signal to trigger initiator circuit 40, explained more fully in connection with FIG. 2. The initiator circuit, as fully explained with the description of FIG. 1 starts the clock mechanism of time computer 38 running. From any convenient source such as control panel 34 of FIG. 1, total take-off time $T_0$ is fed into time computer 38 to have elapsed time ($t$) subtracted therefrom so that runway time remaining ($T_r$) is passed from time computer 38 to an adder 156, which also receives computed refusal time ($T_{ref.}$) from member 160 and subtracts time remaining ($T_r$) therefrom to provide the pilot with a signal announcing the approach of the refusal point, which is the last opportunity for the pilot to successfully abort the take-off attempt and commence braking operation. From time computer 38, a time remaining signal ($T_r$) also passes to an electrical multiplier, for example by movement of the wiper of potentiometer 162, where the A.C. signal $$\frac{dV_p}{dt}$$

is multiplied by the time remaining signal ($T_r$). From potentiometer 162 the A.C. signal $$\left(\frac{dV_p}{dt}\right)T_r$$

which is equal to the predicted final velocity $V_f$ passes to amplifier 164 and is then changed to D.C. in demodulator 166.

Both the $V_f$ signal in line 60 and the present velocity signal, $V_p$, in line 18 are passed through resistors, 168 and 170, much larger than the resistance of indicator 64, to provide a constant current input which is added to form a resultant current proportional to the predicted aircraft velocity at the take-off point. The combined signal $V_p + V_f$ flows into one side of indicator 64. Take-off velocity $V_{TO}$ is passed as a current to indicator 64 from the opposite direction through line 66. Indicator 64 can be a milliammeter, and summation of the actual aircraft velocity current, the product of acceleration × time remaining current, and the required take-off velocity current will deflect the meter in a direction indicative of the actual aircraft condition. A negative indication causes the meter to deflect into the "Stop" region, thereby indicating an inability to take-off. Positive current indicates that the predicted velocity at take-off time will be greater than the required take-off velocity, thereby causing the meter to be deflected into the "Go" region. The prominent feature of this type of adder is that there is a negligible interaction between the signal, and it provides for a more linear type of signal addition, eliminating the need for non-linear calibration of the indicating instrument. The indicator, however, may also be an audio instrument or any instrument which will provide the pilot with a continuous signal indicating whether or not the airplane is capable of being airborne at take-off point.

The take-off velocity signal passed by line 66 is indicated in FIG. 3 as being generated by a manually adjusted potentiometer 174. Because the velocity necessary for take-off is a variable dependent on many parameters such as aircraft weight and flap angle, it is possible to manually compute the take-off velocity beforehand. It can be provided, however, that circuitry will perform some of the desired computations. For example, in FIG. 4 a simple circuit is shown in which the wiper arm of potentiometer 175 is varied as a function of flap angle, either continuously or as a multiple position switch arrangement. The flap angle signal is amplified by the emitter follower circuit including transistor 177 and passed through potentiometer 174 where the wiper arm which picks off the voltage to be sent to indicator 64 is varied by a take-off velocity computed without including flap angle. Thus, for every flap angle position, a new take-off velocity signal will be sent to indicator 64.

Another feature which may be incorporated to assist in computing take-off velocity is a fuel totalizer. At times an aircraft will be held up before take-off, and will consume a considerable amount of fuel while waiting. The gross weight of the aircraft will decrease as fuel is consumed, and the lift needed for take-off is correspondingly reduced. A device such as a fuel totalizer can be utilized to sense the amount of fuel consumed or remaining and vary a potentiometer, such as that of numeral 175 of FIG. 4, and indicate that a change in aircraft weight has taken place. Obviously both aircraft weight and flap angle could be sensed simultaneously and utilized to vary the indicated take-off velocity signal which is sent to indicator 64.

While a preferred embodiment of the invention is shown for illustration purposes, it will be obvious to those skilled in the art that many deviations may be made therefrom without departing from the scope of the invention.

I claim:

1. Apparatus to ascertain early in airplane take-off roll whether the airplane will be airborne at take-off point comprising means to ascertain airplane ground velocity, means to determine remaining runway time means to convert said velocity to acceleration and multiply said acceleration by said remaining runway time to obtain a product, means to add said product and said velocity to obtain a calculated take-off point velocity, and signal means to compare said take-off point velocity to required airplane velocity for take-off.

2. Apparatus to ascertain early in airplane take-off roll whether the airplane will be airborne at take-off point comprising means to calculate predicted airplane velocity at runway take-off point based upon early take-off roll airplane and atmospheric conditions, and signal means to compare said predicted velocity with required airplane velocity for take-off.

3. Apparatus to ascertain early in airplane take-off roll whether the airplane will be airborne at take-off point comprising a differential pressure transducer having a Pitot and a static pressure tap to ascertain airplane ground velocity, an electrical differential circuit to convert said velocity to acceleration, means to ascertain remaining runway time, an electrical multiplier to multiply said acceleration by said remaining runway time to obtain a product, electrical means to add said product and said velocity to obtain a calculated take-off point velocity, and electrical signal comparison means to compare said take-off point velocity to required airplane velocity for take-off.

4. Apparatus to ascertain early in airplane take-off roll whether the airplane will be airborne at take-off point comprising means to ascertain airplane ground velocity, means to determine remaining runway time means to convert said velocity to acceleration and multiply said acceleration by said remaining runway time to obtain a product, means to add said product and said velocity to obtain a calculated take-off point velocity, signal means to compare said take-off point velocity to required airplane velocity for take-off, and means to prevent the actuation of said apparatus until a preselected aceleration is maintained for a preselected period of time.

5. Apparatus to ascertain early in airplane take-off roll whether the airplane will be airborne at take-off point comprising means to ascertain airplane ground velocity, means to determine remaining runway time means to convert said velocity to acceleration and multiply said acceleration by said remaining runway time to obtain a product, means to add said product and said velocity to obtain a calculated take-off point velocity, signal means to compare said take-off point velocity to required airplane velocity for take-off, and means to compare take-off refusal time to said remaining runway time.

6. Apparatus to ascertain early in aircraft runway roll whether the aircraft will be airborne at take-off point comprising means to provide a present aircraft velocity signal, means to provide an aircraft acceleration signal, an initiator circuit connected to and responsive to said acceleration signal, a time computer connected to and triggered by said initiator circuit to provide an elapsed time signal after said acceleration signal has attained a preselected intensity for a period of time, means to provide a total aircraft runway time signal to said time computer, means to subtract said elapsed time signal from said total aircraft runway time signal to provide a remaining runway time signal, means to multiply said remaining runway time signal by said acceleration signal to provide a product, means to amplify said product, means to add said product to said present aircraft velocity signal to obtain a sum, means to provide a required aircraft velocity for take-off signal, and means comparing said required aircraft velocity for take-off signal and said sum.

7. Apparatus to ascertain early in airplane take-off roll whether the airplane will be airborne at take-off point comprising means to ascertain airplane ground velocity, means connected to said airplane ground velocity ascertaining means to predict airplane take-off point velocity, and signal means to compare said predicted take-off point velocity to required airplane velocity for take-off.

8. Apparatus for determining early in aircraft take-off roll whether the aircraft will be airborne at take-off point including means for predicting aircraft velocity at take-off point, means for imparting a signal to said apparatus of the velocity required for aircraft take-off, means for modifying said signal in response to changes of the aircraft flap angle, and means for continually comparing said modified required velocity signal with said predicted aircraft velocity at take-off point.

References Cited in the file of this patent

UNITED STATES PATENTS

| | | |
|---|---|---|
| 2,579,902 | Carbonara et al. | Dec. 25, 1951 |
| 2,807,165 | Kuzyk et al. | Sept. 24, 1957 |
| 2,816,724 | Snodgrass | Dec. 17, 1957 |
| 2,922,982 | Hoekstra | Jan. 26, 1960 |

OTHER REFERENCES

Klass: "Monitor Designed To Aid Jet Takeoffs," Aviation Week Magazine, June 23, 1958, pages 65, 67, 69, 70 and 71.

Publication, "Takeoff Monitors Compete for Market," Aviation Week Magazine, July 28, 1958, pages 77–79.

Morris et al.: NACA Technical Note 3252, November 1954, 19 pages.

UNITED STATES PATENT OFFICE
CERTIFICATE OF CORRECTION

Patent No. 3,116,638            January 7, 1964

Charles B. Brahm

It is hereby certified that error appears in the above numbered patent requiring correction and that the said Letters Patent should read as corrected below.

Column 7, line 63, for "Pilot" read -- pitot --; column 8, line 36, for "amplfy" read -- amplify --.

Signed and sealed this 16th day of June 1964.

(SEAL)
Attest:

ERNEST W. SWIDER
Attesting Officer

EDWARD J. BRENNER
Commissioner of Patents